(12) United States Patent
Seong

(10) Patent No.: US 6,176,656 B1
(45) Date of Patent: Jan. 23, 2001

(54) MACHINE TOOL WITH A SPLASH GUARD ARRANGEMENT

(75) Inventor: Ki Eun Seong, Kyongnam (KR)

(73) Assignee: Daewoo Heavy Industries Ltd., Incheon (KR)

( * ) Notice: Under 35 U.S.C. 154(b), the term of this patent shall be extended for 0 days.

(21) Appl. No.: 09/315,963

(22) Filed: May 21, 1999

(30) Foreign Application Priority Data

Sep. 5, 1998 (KR) .................................................. 98 36631

(51) Int. Cl.[7] .............................. B23Q 11/08; B23C 9/00
(52) U.S. Cl. ...................................... 409/134; 29/DIG. 56; 408/710; 451/455
(58) Field of Search ...................................... 409/134, 137; 451/455; 74/608, 609, 614; 408/241.6, 710; 29/DIG. 56; 483/3

(56) References Cited

U.S. PATENT DOCUMENTS

| | | | |
|---|---|---|---|
| 4,768,902 | * 9/1988 | Rutschle et al. | 409/134 |
| 4,863,319 | 9/1989 | Winkler et al. | 409/137 |
| 5,342,156 | * 8/1994 | Baba | 409/134 |
| 5,364,210 | 11/1994 | Rütschle et al. | 409/134 |
| 5,435,675 | * 7/1995 | Rutschle | 409/134 |
| 5,658,105 | * 8/1997 | Takahashi | 451/455 X |
| 5,971,679 | * 10/1999 | Kim | 408/241.6 X |

\* cited by examiner

*Primary Examiner*—William Briggs
(74) *Attorney, Agent, or Firm*—Staas & Halsey LLP

(57) ABSTRACT

A machine tool comprises a spindle stock and a worktable provided in front of the spindle stock to support workpieces thereon and capable of up-down movement and swivelling movement about a vertically extending center axis. Also employed in the machine tool is a splash guard arrangement which spatially divides the worktable into a machining region disposed in proximity to the spindle stock and a mounting region positioned distal to the spindle stock. The splash guard arrangement includes a rotary guard rigidly attached to the worktable for movement as a unit with the worktable, a stationary guard provided above the rotary guard and a sealing slider elevationally movably held by the stationary guard. The sealing slider remains in pivotal engagement with the rotary guard so that the slider can be subjected to up-down movement together with the rotary guard, while allowing the swivelling movement of the worktable and the rotary guard independently of the slider.

9 Claims, 5 Drawing Sheets

MACHINE TOOL WITH A SPLASH GUARD ARRANGEMENT

FIELD OF THE INVENTION

The present invention relates generally to a machine tool and more specifically to a machine tool of the type comprising a splash guard arrangement provided above a workpiece table for dividing it into a machining region and a mounting region, the splash guard arrangement adapted to prevent metal chips and/or coolant from flying into the mounting region and usable for an extended period of time with no or little possibility of failure or damage.

DESCRIPTION OF THE PRIOR ART

As is generally known in the art, such a machine tool as machining center includes, among other things, a worktable arranged on a base in order to support workpieces thereon, a spindle stock capable of rotatingly driving a tool to cut the workpieces into a desired shape, a tool magazine for storage of a series of different tools in an arranged state and a tool changer whose function is to have the tools loaded into or unloaded from a rotating spindle of the spindle stock.

The worktable of the conventional machine tool is subdivided into two adjoining regions. Every time the worktable is rotated by 180 degrees, one region serving as a machining side is brought into a position near the spindle stock, while the other region serving as a mounting side is brought into a position near the operator. This enables the operator to mount the next workpiece on the mounting side during the time the workpiece mounted on the machining side is being cut. As used herein, the region serving as a machining side is referred to as a "machining region", while the region serving as a mounting side is called a "mounting region".

Need exists for a splash guard arrangement that can inhibit coolant or metal chips from splashing out of the machining region into the mounting region, which would otherwise cause the operator to be soiled with the splashing coolant or injured by the flying metal chips.

A typical example of such splash guard arrangement is taught in U.S. Pat. No. 4,863,319 to Winkler et al, wherein a machine tool comprises a spindle stock and a worktable having an upper surface thereon for mounting and machining workpieces. The worktable and the spindle stock are alternatively displaceable relative to each other in a plane parallel to the upper surface from a first position at which a first portion of the upper surface is disposed proximate the spindle stock and serves as a processing area and a second portion of said upper surface is disposed distal to said spindle stock and serves as a mounting area, to a second position at which the upper surface second portion is disposed proximate the spindle stock and serves as a processing area and the upper surface first portion is disposed distal to the spindle stock and serves as a mounting area. A splash guard wall is provided for separating the processing and the mounting areas. The splash guard wall is attached to the table upper surface by means of a hinge defining a first pivot axis. Thus, the splash guard wall may be folded about the first pivot axis relative to the upper surface in order that a first working space above the processing area remains larger than a second working space above the mounting area when either the first or second portions of the upper surface is proximate to the spindle stock.

U.S. Pat. No. 5,364,210 to Rütschle et al discloses a machine tool comprising a workpiece table that can rotate about a vertical axis. A first spray shielding panel is rigidly attached to the workpiece table substantially along one diameter thereof. It divides the workpiece table into a placement side and a machining side. A second spray shielding panel is arranged above the first spray shielding panel, and runs substantially parallel thereto. An articulated third spray shielding panel connects the first and second spray shielding panel to one another. It is connected at its top in a hinged manner to the second spray shielding panel and is provided with a channel at its bottom that encloses an upper edge of the first spray shielding panel over a finite length.

One drawback associated with the prior art machine tools referred to above lies in the fact that, due to the frequent rotating movement of the worktable, the bottom edge of a stationary splash guard wall usually made of a flexible material is highly susceptible to unwanted damage or premature failure, thus resulting in a shortened period of service life of the splash guard arrangement as a whole. Another shortcoming noted in the conventional machine tools is that there still remains a possibility of metal chips or coolant being splashed to the mounting region through a gap unavoidably existing above the top edge of a rotating splash guard panel.

SUMMARY OF THE INVENTION

Accordingly, it is an object of the invention to provide a machine tool with a splash guard arrangement which can substantially eliminate the deficiencies inherent in the aforementioned and other prior art machine tools.

Another object of the invention is to provide a machine tool with a splash guard arrangement that can be put in use for a prolonged period of time with little fear of premature failure, while assuredly inhibiting metal chips or coolant from flying around out of a machining region.

With these objects in view, the invention resides in the provision of a machine tool comprising: a spindle stock; a worktable provided in front of the spindle stock to support workpieces thereon and capable of up-down movement and swivelling movement about a vertically extending center axis; and splash guard means for spatially dividing the worktable into a machining region disposed in proximity to the spindle stock and a mounting region positioned distal to the spindle stock, wherein said splash guard means includes a rotary guard rigidly attached to the worktable for movement as a unit with the worktable, a stationary guard provided above the rotary guard and a sealing slider elevationally movably held by the stationary guard, said sealing slider remaining in pivotal engagement with the rotary guard so that the slider can be subjected to up-down movement together with the rotary guard, while allowing the swivelling movement of the worktable and the rotary guard independently of the slider.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
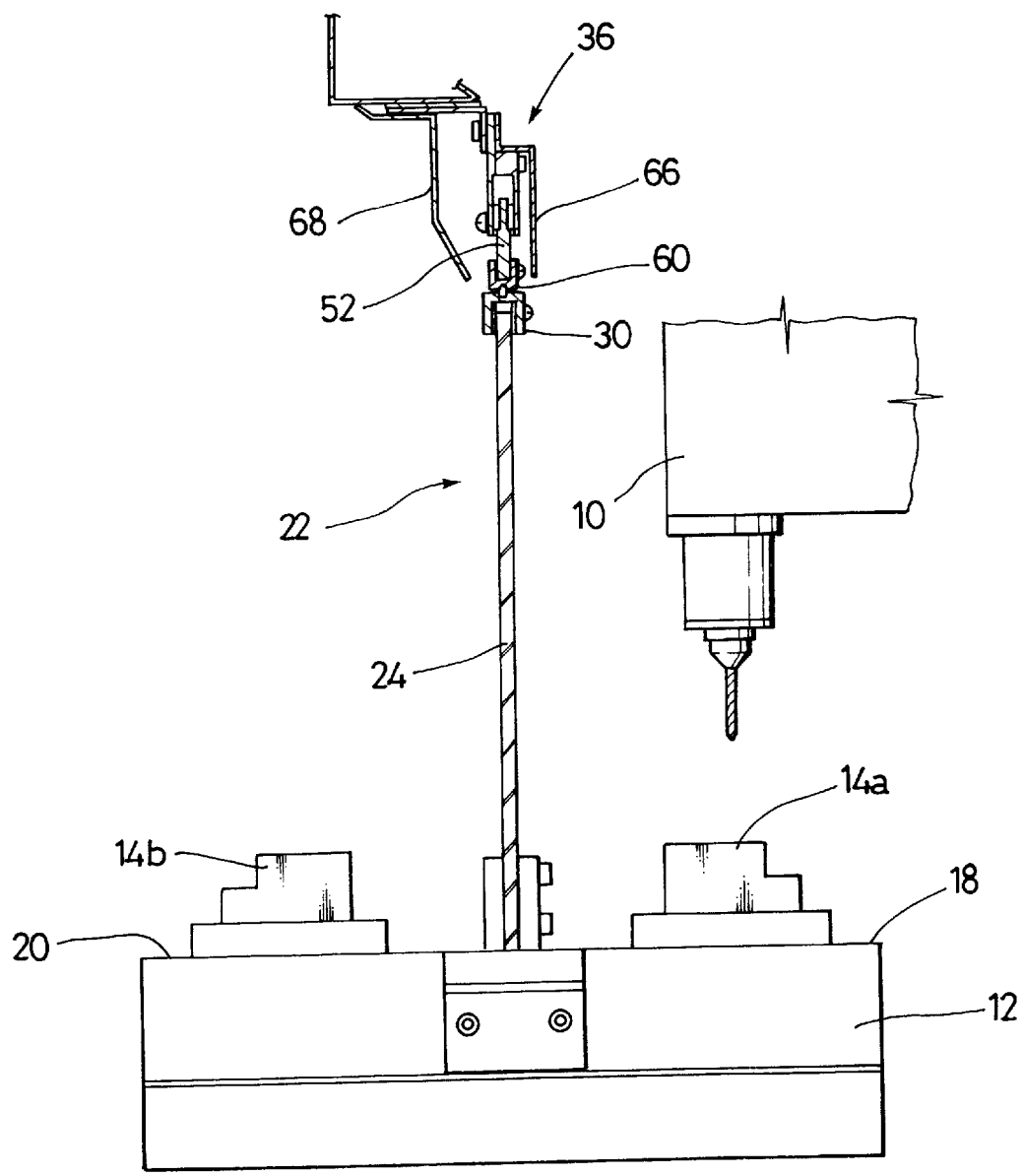
FIG. 1 is a partially cut away, side elevational view of a portion of a machine tool in accordance with the invention.
Figure 2:
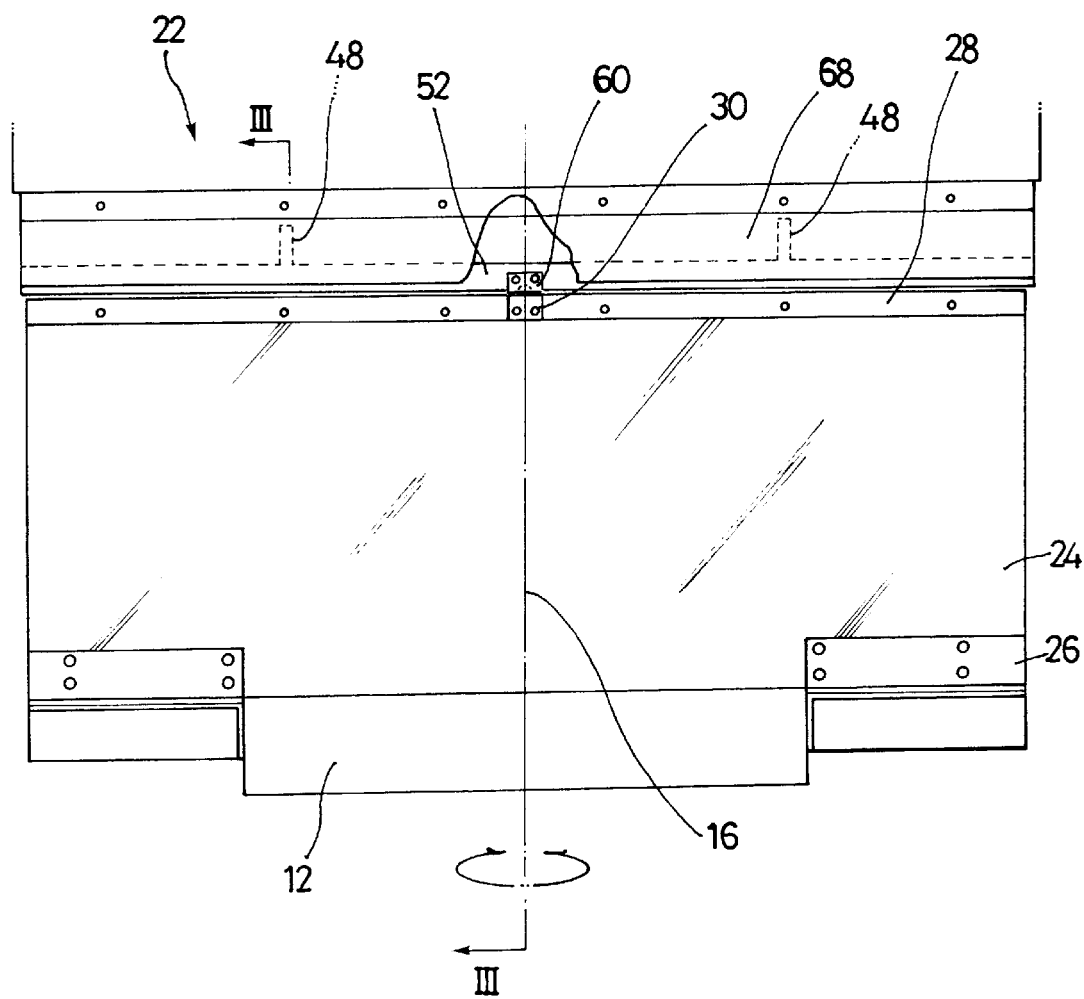
FIG. 2 is a partially broken away, front elevational view showing a portion of a machine tool in accordance with the invention.

Referring first to FIGS. 1 and 2, it can be appreciated that a machine tool according the invention comprises a spindle stock 10 and a worktable 12 having an upper surface for supporting workpieces 14a, 14b to be machined. The worktable 12 can be subjected to up-down movement and is swivellable 180 degrees about a vertically extending center axis designated at 16 in FIG. 2, from a first position at which a first half of the worktable 12 is disposed in proximity to the spindle stock 10 thus serving as a machining region 18 and a second half of the worktable 12 is disposed distal to the spindle stock 10 thus serving as a mounting region 20, to a second position at which the second half of the worktable 12 is disposed in proximity to the spindle stock 10 thus serving as the machining region 18 and the first half of the worktable 12 is disposed distal to the spindle stock 10 thus serving as the mounting region 20. The mounted workpiece 14a can be machined or processed in the machining region 18, while another workpiece 14b to be cut can be mounted by the operator in the mounting region 20.

A splash guard arrangement, designated as a whole by reference numeral 22, is employed to spatially separate the worktable 12 into the machining and the mounting regions 18, 20. The key role of the splash guard arrangement 22 is to inhibit coolant and metal chips from flying around out of the machining region 18. As clearly illustrated in FIGS. 3 through 5, the splash guard arrangement 22 includes a rotary guard panel 24 rigidly attached at a right angle to an upper surface of the woktable 12 by means of a mounting bracket 26. This assures that the rotary guard panel 24 is subjected to up-down and swivelling movement together with the worktable 12. Preferably, the rotary guard panel 24 is made of transparent material such that the operator can observe the machining works done in the machining region 18. Removably fitted to the top edge of the rotary guard panel 24 is an elongated, elastically deformable cap 28 which runs along the full length of the rotary guard panel 24. A rotary guard bracket 30 of generally inverted U-shape is affixed to the central top edge of the rotary guard panel 24 as by bolt-nut fasteners 32. It can be seen that the guard bracket 30 has an upwardly projecting pivot pin 34 whose top end is of round configuration.

The splash guard arrangement further includes a stationary guard structure, designated as a whole by reference numeral 36, which is provided above the rotary guard panel 24. Left between the rotary guard panel 24 and the stationary guard structure 36 is a gap great enough to permit the up-down movement of the rotary guard panel 24 with respect to the stationary guard structure 36. The stationary guard structure 36 has a pair of spaced-apart, parallel channel plates 38, 40 fixedly attached to a machine tool frame 42 through the use of a mounting bracket 44. The channel plates 38, 40 cooperate with each other to define therebetween a downwardly opened, elongated channel 46. And vertically extending guide grooves 48, 50 of generally semicircular cross-section are formed on an internal surface of the respective one of the channel plates 38, 40.

The splash guard arrangement 22 also includes a sealing slider 52 which remains elevationally movably held by the stationary guard structure 36. The sealing slider 52 extends along the full length of the top edge of the rotary guard panel 24 so as to close off the gap existing between the top edge of the rotary guard panel 24 and the lower edges of the channel plates 38, 40. The sealing slider 52 is slidingly received at its upper edge in the channel 46 of the stationary guard structure 36 and is kept at its lower central edge in pivotal engagement with the rotary guard panel 24.

Specifically, the sealing slider 52 has on its opposite surfaces a pair of vertically extending guide pins 54, 56 that are slidably engaged with the guide grooves 48, 50 of the channel plates 38, 40, thereby assuring smooth and stabilized up-down sliding movement of the sealing slider 52 in the channel 46 of the stationary guard structure 36. Fixedly secured by bolt-nut fasteners 58 to the central lower edge of the sealing slider 52 is a slider bracket 60 of generally U-shape having a downwardly facing pivot recess 62 which comes into pivotal engagement with the pivot pin 34 of the rotary guard bracket 30 mounted on the top edge of the rotary guard panel 24. In order for the worktable 12 and the rotary guard panel 24 to be swivelled about the vertically extending center axis 16, it is required that the pivot pin 34 of the rotary guard bracket 30 and the pivot recess 62 of the slider bracket 60 be in exact alignment with the center axis 16. According to the construction set forth above, the sealing slider 52 can be subjected to up-down movement together with the worktable 12 and the rotary guard panel 24 in the pallet changing process, while allowing the swivelling movement of the latter independently of the sealing slider 52.

Figure 3:
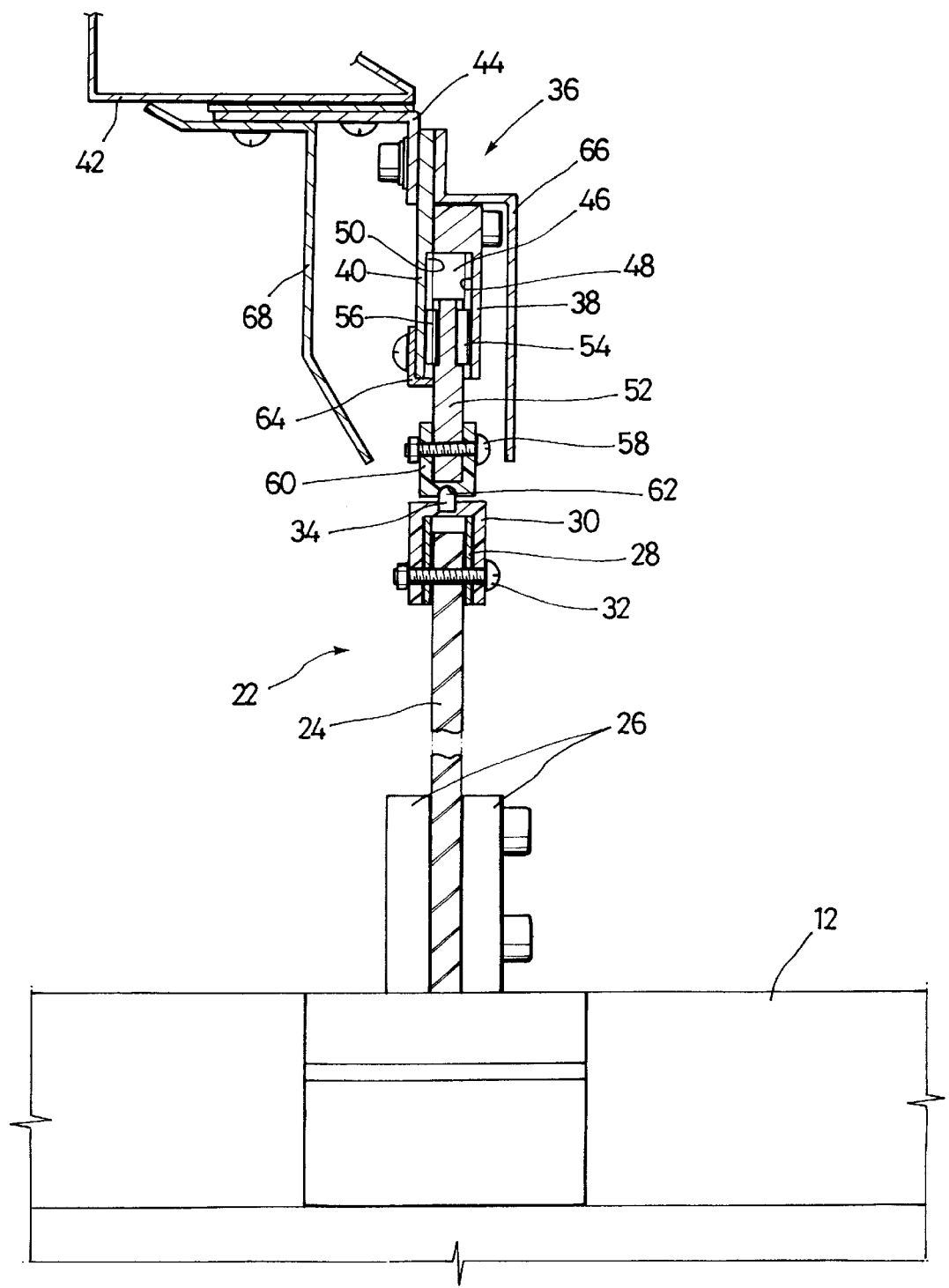
FIG. 3 is an enlarged, side elevational, section view taken along line III—III in FIG. 2, best showing a splash guard arrangement employed in a machine tool of the invention.
Figure 4:
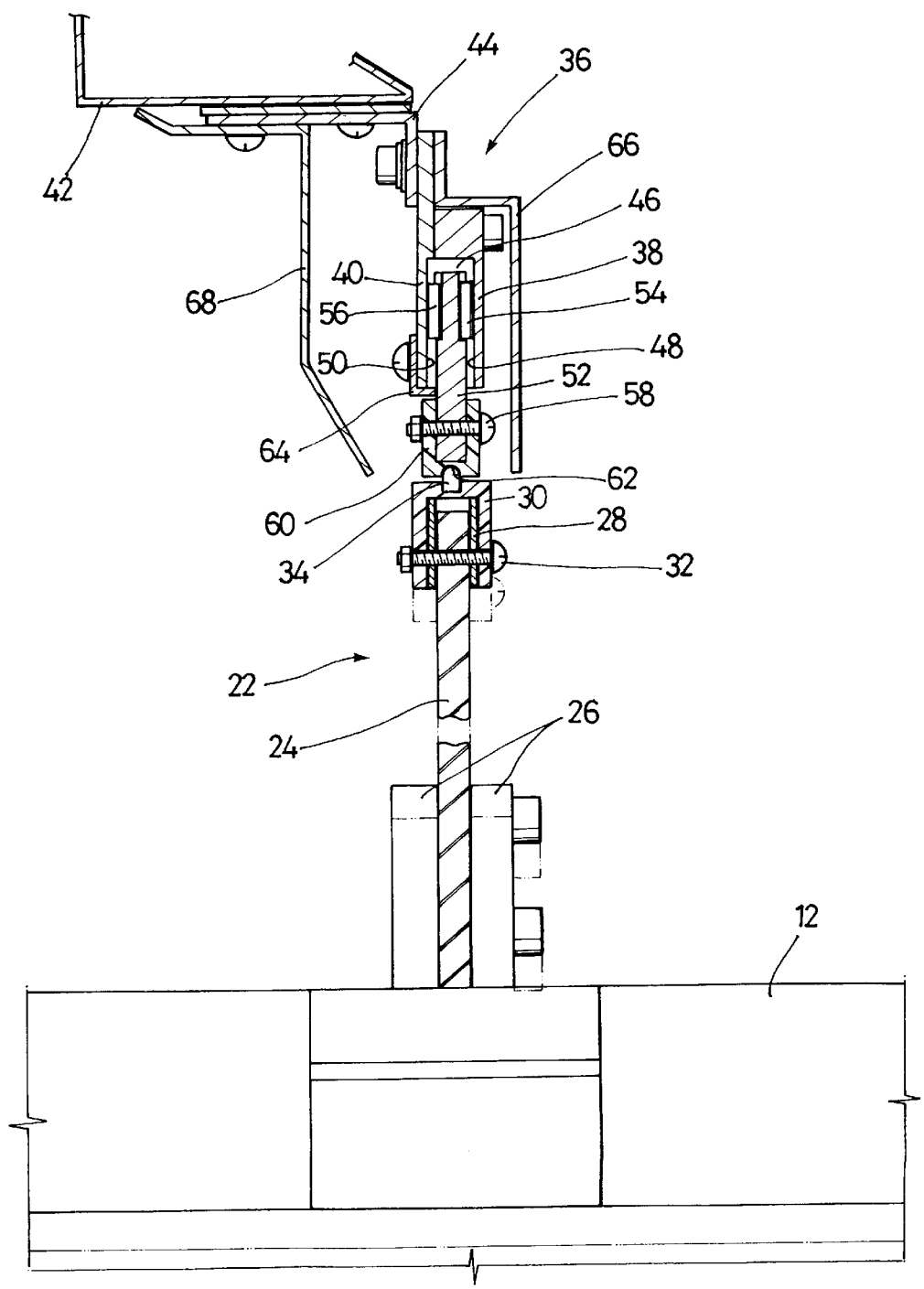
FIG. 4 is a view similar to FIG. 3 but illustrating a worktable and a rotary guard panel moved upwards in the course of worktable rotating operation.
Figure 5:
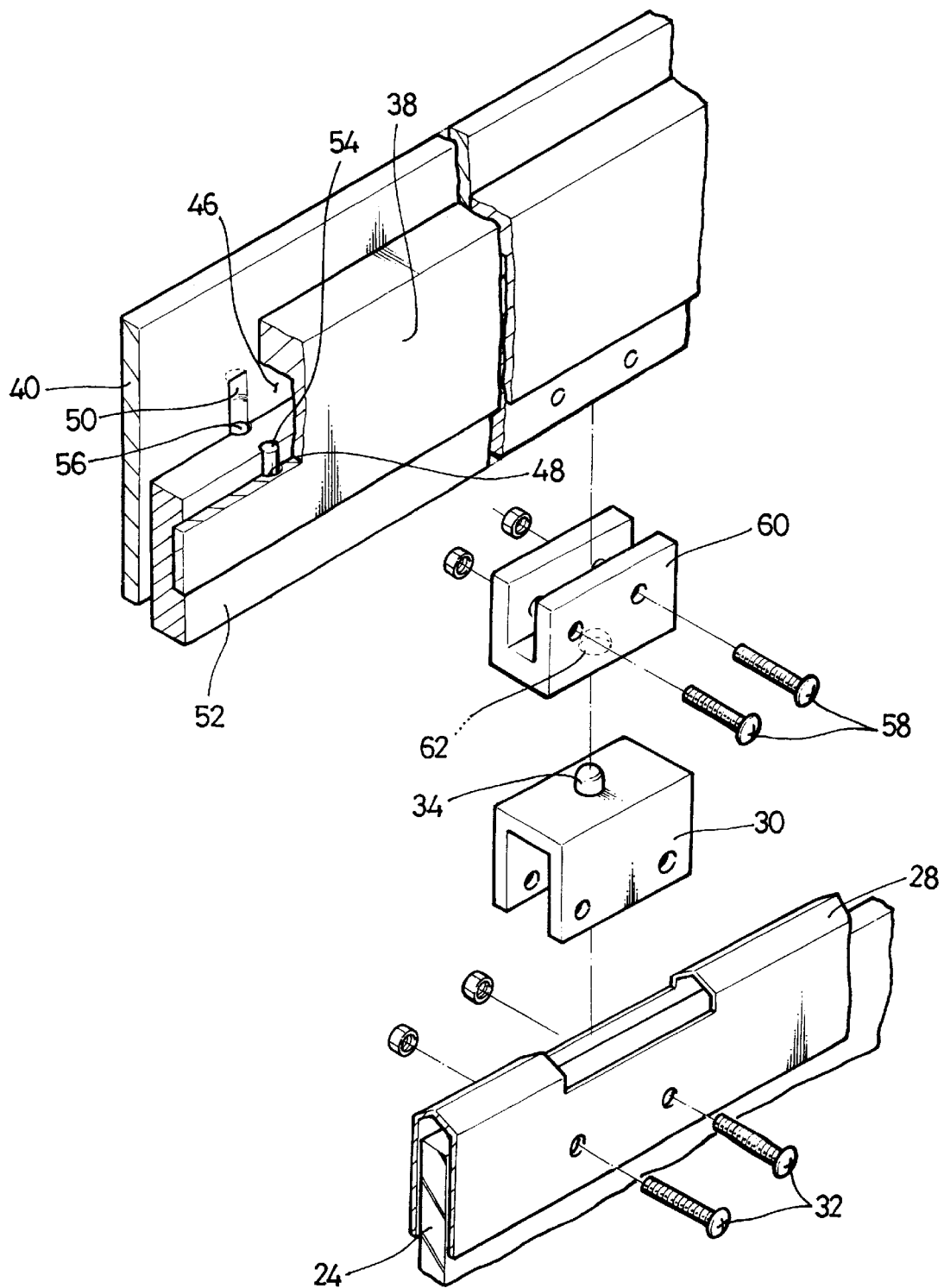
FIG. 5 is a partially cut away, exploded, perspective view showing a splash guard arrangement employed in a machine tool of the invention.

Additionally and optionally, as clearly shown in FIGS. 3 and 4, a retainer bracket 64 is bolted to the lower end of the channel plate 40 to prevent the sealing slider 52 from unwanted removal out of the channel 46 of the stationary guard structure 36. It is also preferred that the stationary guard structure 36 has a machining side shroud plate 66 provided above the machining region 18 of the worktable 12 and a mounting side shroud plate 68 disposed above the mounting region 20 of the worktable 12 so as to cover and protect the channel plates 38, 40 and the sealing slider 52.

Operation of the afore-mentioned machine tool will now be described in detail, with emphasis placed on the movement of the splash guard arrangement.

During the time the workpiece 14a on the worktable 12 is machined by a tool of the spindle stock 10, it is noted in FIG. 3 that the worktable 12 and the rotary guard panel 24 are kept in a lowered position. This allows the sealing slider 52 to be slid down, due to the gravitational force, within the channel 46 of the stationary guard structure 36. The pivot pin 34 of the rotary guard bracket 30 continues to engage with the pivot recess 62 of the slider bracket 60. Under this state, no or little gap exists between the top edge of the rotary guard panel 24 and the lower edge of the sealing slider 52 such that the coolant or metal chips are prevented from splashing into the mounting region 20 of the worktable 12 through the splash guard arrangement 22 while the workpiece 14a is processed in the machining region 18.

At the termination of the machining operation of the workpiece 14a, it becomes necessary to have the workpiece 14b in the mounting region 20 changed with the one 14a in the machining region 18. To do this task, the worktable 12 has to be first lifted up a short distance for free rotation together with the rotary guard panel 24 into a raised position as shown in FIG. 4. Such an upward movement of the worktable 12 and the rotary guard panel 24 causes the sealing slider 52 to be pushed upwards in the channel 46 of the stationary guard structure 36. At this time, the guide grooves 48, 50 of the channel plates 38, 40 and the guide pins 54, 56 of the sealing slider 52 assures smooth and stabilized sliding movement of the sealing slider 52 itself. The rotary guard panel 24 is then swivelled 180 degrees in one direction about the center axis 16 together with the worktable 12. Since the rotary guard panel 24 makes pivotal engagement with the stationary guard structure 36 through the sealing slider 52, the swivelling movement of the workable 12 and the rotary guard panel 24 is performed independently of the sealing slider 52.

Just after the workpiece 14b in the mounting region 20 has moved into the machining region 18 by the swivelling movement explained above, the worktable 12 and the rotary guard panel 24 are caused to move down into the lowered position in preparation for the next machining process. The sealing slider 52 moves downwards by itself, due to the gravity exerting thereto, simultaneously with or immediately after the down-movement of the worktable 12 and the rotary guard panel 24.

While the invention has been shown and described with reference to a preferred embodiment, it should be apparent to those skilled in the art that many changes and modifications may be made without departing from the scope of the invention as defined in the claims.

What is claimed is:

1. A machine tool comprising:

a spindle stock;

a worktable provided in front of the spindle stock to support workpieces thereon and capable of up-down movement and swivelling movement about a vertically extending center axis; and splash guard means for spatially dividing the worktable into a machining region disposed in proximity to the spindle stock and a mounting region positioned distal to the spindle stock, wherein said splash guard means includes a rotary guard rigidly attached to the worktable for movement as a unit with the worktable, a stationary guard provided above the rotary guard and a sealing slider elevationally movably held by the stationary guard and a pivotal connection, generally aligned with said central axis, between said sealing slider and said rotary guard, said sealing slider remaining in pivotal engagement with the rotary guard so that the slider can be subjected to up-down movement together with the rotary guard, while allowing the swivelling movement of the worktable and the rotary guard independently of the slider.

2. The machine tool as recited in claim 1, wherein said stationary guard has a pair of spaced-apart, parallel channel plates defining therebetween a downwardly opened, elongated channel which slidingly receives the sealing slider.

3. The machine tool as recited in claim 2, wherein each of said channel plates has at least one vertically extending guide groove formed on an internal surface of the respective one of the channel plates and said sealing slider has at least one guide pin slidably engaged with the guide groove.

4. The machine tool as recited in claim 2, wherein said stationary guard has a retainer bracket adapted to prevent the sealing slider from removal out of the elongated channel.

5. The machine tool as recited in claim 2, wherein said stationary guard has a machining side shroud plate provided above the machining region of the worktable to cover the sealing slider and the channel plates.

6. The machine tool as recited in claim 5, wherein said stationary guard has a mounting side shroud plate provided above the mounting region of the worktable to cover the sealing slider and the channel plates.

7. The machine tool as recited in claim 1, wherein said sealing slider is provided with a slider bracket affixed to a lower edge of the slider and having a downwardly facing pivot recess.

8. The machine tool as recited in claim 7, werein said rotary guard is provided with a rotary guard bracket secured to a top edge of the rotary guard and having an upwardly projecting pivot pin engaging with the pivot recess of the slider bracket.

9. The machine tool as recited in claim 8, wherein said pivot recess of the slider bracket and said pivot pin of the rotary guard bracket are disposed in exact alignment with said vertically extending center axis of the worktable.

* * * * *